M. P. BRISCOE.
COMBINED PLANTER AND FERTILIZER DISTRIBUTER.
APPLICATION FILED MAR. 6, 1912. RENEWED MAR. 27, 1914.
1,115,777.
Patented Nov. 3, 1914.
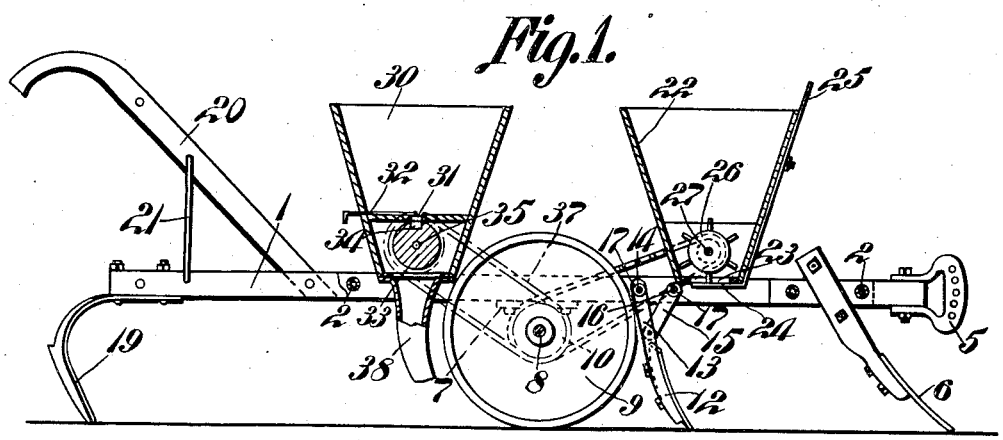
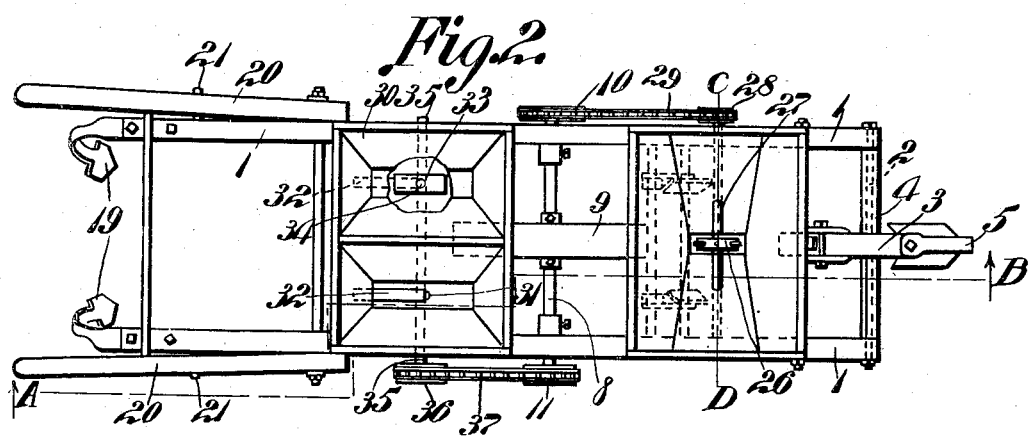
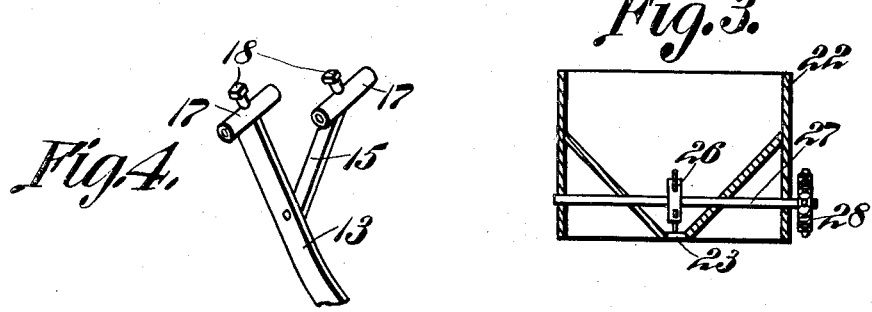
M. P. Briscoe,
Inventor
by C. A. Snow & Co.
Attorneys
Witnesses

UNITED STATES PATENT OFFICE.

MADISON P. BRISCOE, OF ATHENS, GEORGIA.

COMBINED PLANTER AND FERTILIZER-DISTRIBUTER.

1,115,777.  Specification of Letters Patent.  Patented Nov. 3, 1914.

Application filed March 6, 1912, Serial No. 682,044. Renewed March 27, 1914. Serial No. 827,770.

*To all whom it may concern:*

Be it known that I, MADISON P. BRISCOE, a citizen of the United States, residing at Athens, in the county of Clarke and State of Georgia, have invented a new and useful Combined Planter and Fertilizer-Distributer, of which the following is a specification.

This invention relates to a combined planter and fertilizer distributer, one of the objects of the invention being to provide a simple and durable structure of this character which is balanced upon a single supporting wheel whereby the structure can be manipulated easily.

A further object is to provide a machine of this character having boxes for holding fertilizer and seeds respectively, means being provided whereby fertilizer can be dropped into the furrow and subsequently covered after which seeds are deposited onto the soil covering the fertilizer and these seeds, in turn, covered by means of shovels, provided for that purpose. Thus it will be seen that, at a single operation, a furrow may be opened, fertilizer deposited therein and covered, and seeds dropped onto the soil above the fertilizer and finally covered.

A further object is to provide agitating and dropping mechanism in the respective boxes and which is driven from the single supporting wheel.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a longitudinal section through the machine, said section being taken on the line A—B Fig. 2. Fig. 2 is a plan view of the machine. Fig. 3 is a section on line C—D Fig. 2, said section being taken solely through the box for holding fertilizer. Fig. 4 is a perspective view of the upper end portion of one of the standards and its brace.

Referring to the figures by characters of reference 1 designates side beams of the frame of the machine these beams being connected by cross rods 2. A tongue 3 is interposed between the front ends of the side beams 1 and the front rods 2 extend transversely through it, there being spacing sleeves 4 upon the rods and between the tongue and the side beams. A clevis 5 is located at the front end of the tongue and a furrow opener 6 is preferably connected to this tongue at a point between the rods 2.

Brackets 7 are secured to the side beams 1 close to the centers thereof and a shaft 8 is journaled in them and is supported, at its center, by a furrow wheel 9. This shaft rotates with the wheel and is provided at its ends with sprockets 10 and 11 respectively.

Covering shovels are located in front of and at opposite sides of the path of the wheel 9, these shovels being indicated at 12 and each of them having its standard 13 mounted on a cross rod 14. Braces 15 extend forwardly and upwardly from the standards and are slidably mounted on a cross rod 16. Each of the standards 13 and the braces 15 has a tubular head 17 at its upper end which adjustably engages one of the rods 14 or 16 and set screws 18 are provided whereby these heads can be held in any positions to which they may be adjusted.

Additional covering shovels 19 are connected to the rear ends of the side beams 1 and are adapted to completely close the furrows after the seeds and fertilizer have been deposited therein.

Handles 20 are connected to the side beams 1 and extend upwardly and rearwardly therefrom, these handles being suitably braced, as at 21.

Detachably mounted on the side beams 1 between the furrow opener 6 and the covering blades 12 is a hopper or box 22 having an outlet opening in the bottom thereof as indicated at 23, said opening being normally closed as by means of a plate 24 located at the lower end of a shifting lever 25. An agitating wheel 26 is mounted for rotation within the lower portion of the box 22 and is secured to a shaft 27 extending transversely of the box. This shaft is provided, at one end, with a sprocket 28 adapted to receive motion, through a chain 29, from the sprocket 10. Detachably mounted on the side beams 1 between the wheel 9 and the shovels 19 is a seed box 30 preferably provided with two compartments arranged side by side. Each of these compartments has an outlet 31 in the bottom thereof normally closed by means of a cut-off slide 32. A dropping wheel 33 is mounted to rotate under the outlet 31 and has one or more recesses 34 adapted to receive the seeds discharging through the outlet 31. The dropping wheels 33 are secured to a shaft 35 extending transversely of the box 30 and provided, at one end, with a sprocket 36 adapted to receive motion, through a chain 37, from the sprocket 11.

Boots 38 extend downwardly from the respective compartments of the box 30 and are adapted to direct the seeds from the dropping wheels 33 into the furrow back of wheel 9.

It will be understood that when the machine is drawn forward the plow 6 will open a furrow and the supporting wheel 9 traveling in this furrow will operate the two shafts 27 and 35 through the chains 29 and 37 respectively. If the plate 24 is in open position, it will be apparent that the agitating wheel 26, during its rotation, will force portions of the contents of the box 22 through the opening 23 and into the furrow back of the plow 6. The blades 12 operate to direct dirt into the furrow so as to partly fill the same and to cover the deposited fertilizer. Wheel 9 travels back of these covering blades 12 and presses the fertilizer and the loose earth covering down into the furrow after which seed is dropped into the furrow through the boots 38, the dropping being effected by the rotating wheels 33. The shovels 19 finally operate to throw the soil into the furrow and thus cover the seeds. Thus it will be seen that in one operation the furrow is opened, the fertilizer is deposited and covered, the seeds are dropped and the furrow is closed.

Although the box containing the fertilizer is preferably arranged in front of the wheel 9 and the seed box back of this wheel, it is to be understood that the arrangement can be reversed so that the seeds will first be dropped and covered after which fertilizer will be deposited in the furrow.

By mounting the blades 12 in the manner described it will be seen that they can be adjusted toward or from each other so as to be adapted for use in connection with furrows of different widths.

Obviously any type of plow desired can be used at the front end of the machine in lieu of the plow 6.

What is claimed is:—

1. A furrow wheel, a frame substantially balanced thereon, a furrow opener at the front end of the structure, front and rear receptacles mounted on the structure and said wheel being extended between them, parallel rods extending transversely within the structure and between the front receptacle and the wheel, sleeves adjustable longitudinally along the rods, means for securing said sleeves against movement, covering devices connected to the sleeves on one of the rods, braces connecting said devices to the sleeves on the other rods.

2. A furrow wheel, a frame substantially balanced thereon, a box supported on the frame and back of the wheel, said box having separate compartments arranged side by side, boots for receiving material from the compartments and discharging it into the furrow in which the wheel is mounted at a point back of the wheel, a box mounted on the frame and in front of the wheel, the two boxes being so positioned as to balance the frame substantially upon the wheel, dropping mechanism mounted within the two boxes, separate means actuated by the wheel for driving said dropping mechanism, a furrow opener in front of the front box, covering shovels carried by the frame and located between the front box and the wheel, and additional covering shovels carried by the rear portion of the frame and back of the boots.

In testimony that I claim the foregoing as my own, I have hereto affixed my signature in the presence of two witnesses.

MADISON P. BRISCOE.

Witnesses:
R. C. HALE,
H. G. STORY.